Nov. 14, 1950 — L. W. GACKI — 2,529,728
INTERVALOMETER
Filed Jan. 31, 1944 — 5 Sheets-Sheet 1

INVENTOR
LEONARD W. GACKI
BY Blair, Curtis & Hayward
ATTORNEYS

Nov. 14, 1950 L. W. GACKI 2,529,728
INTERVALOMETER
Filed Jan. 31, 1944 5 Sheets-Sheet 3

INVENTOR
LEONARD W. GACKI
BY
Blair, Curtis + Hayward
ATTORNEYS

Nov. 14, 1950

L. W. GACKI 2,529,728

INTERVALOMETER

Filed Jan. 31, 1944

INVENTOR
LEONARD W. GACKI
BY
Blair, Curtis & Hayward
ATTORNEYS

Nov. 14, 1950 　　　L. W. GACKI 　　　2,529,728
INTERVALOMETER

Filed Jan. 31, 1944 　　　　　　　　　　　5 Sheets-Sheet 5

INVENTOR
LEONARD W. GACKI
BY Blair, Curtis & Hayward
ATTORNEYS

Patented Nov. 14, 1950

2,529,728

UNITED STATES PATENT OFFICE 2,529,728

INTERVALOMETER

Leonard W. Gacki, Jamaica, N. Y., assignor to Fairchild Camera and Instrument Corporation, a corporation of Delaware Application January 31, 1944, Serial No. 520,575

10 Claims. (Cl. 161—1)

This invention relates to a device for creating successive impulses at selectively predetermined intervals, and more particularly to a so-called intervalometer which may be used in conjunction with an aerial camera for tripping the camera shutter at regularly timed intervals of predetermined duration.

One of the objects of this invention is to provide an intervalometer which is compact, relatively light in weight and capable of being manufactured in large quantities in accordance with mass production prerequisites. Another object is to provide an intervalometer which is relatively simple in construction, and which is sturdy and durable under conditions of extended, rigorous use. Another object is to provide an intervalometer which is thoroughly dependable under all conditions of usage, and by which the duration of the intervals may be varied by increments on the order of one second. Another object is to provide an intervalometer which at all times gives visual indication of the period of time remaining of the interval before effecting or creating an operating impulse. Another object is to provide an intervalometer which may be reset during operation so as to change the duration of the immediate interval, as well as that of the following interval. Another object is to provide an intervalometer capable of having its cyclic operation interrupted at any time during the interval so as to recommence a cycle of operation. Another object is to provide an intervalometer which may be actuated to create an impulse at any time regardless of the operative condition thereof. Other objects will be in part apparent and in part pointed out hereinafter.

The invention accordingly consists in the features of construction, combinations of elements and arrangements of parts, as will be exemplified in the structure to be hereinafter described, and the scope of the application of which will be indicated in the following claims.

In the drawing, wherein I have shown one form of my invention,

Similar reference characters refer to similar parts throughout the various views of the drawing.

Figure 1:
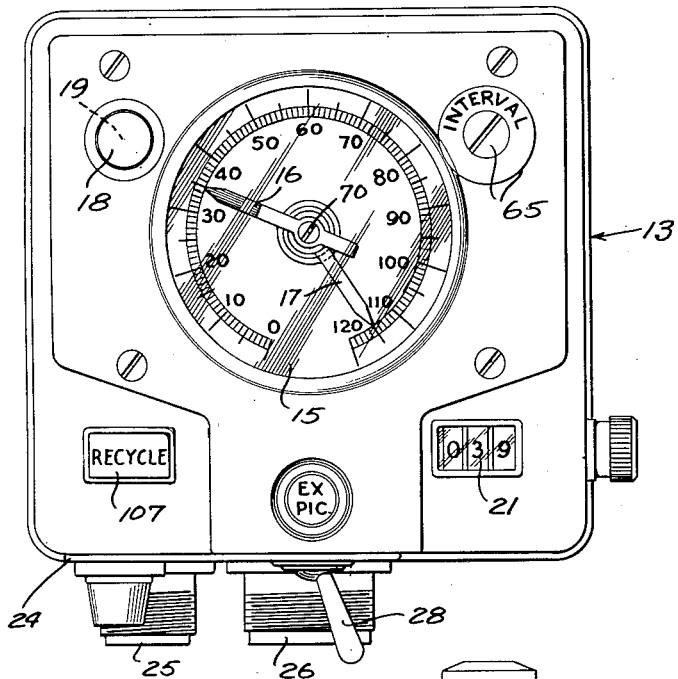
Figure 1 is a top plan view of my intervalometer.

In aerial photography, particularly where photographs are being made of terrain for mapping purposes, it is desirable that a substantial number of successive exposures be made at regular intervals so that each photograph includes a portion of the terrain photographed during the preceding exposure. Thus it is important to be able not only to make successive exposures at regular intervals, but also to be able to selectively predetermine the duration of the interval in accordance with the conditions under which the exposures are being made so as to obtain the required amount of overlap between successive pictures. If, for example, the aircraft on which the camera is mounted is flying at a relatively low altitude, and at a high rate of speed, it might be desirable that the interval between exposures be of extremely short duration, say of the order of two seconds, whereas if the aircraft is flying at a substantial altitude and a relatively slow speed, an interval of the order of one hundred seconds might well provide the amount of overlap between successive photographs that is required.

Between the minimum and maximum intervals there should be available a wide range of intervals readily selectable in accordance with circumstances and at any time during the mapping flight, regardless of the previous interval selection or the immediate operative condition of the intervalometer.

Inasmuch as conditions of flight are practically unpredictable as the aircraft is on its mission, it is important that the pilot or photographer or both should be able to determine at any moment the amount of time remaining before the intervalometer creates or effects a camera operating impulse in order that the aircraft may be manoeuvered into the best possible attitude for efficient operation of the camera.

It is another object of my invention to provide an intervalometer which meets these conditions in a thoroughly practical and efficient manner.

Referring now to the drawing, the intervalometer includes a base plate 10 (Figure 2) having fastened thereto guides 11 and 12 which provide means for readily attaching the intervalometer to complementary members within the aircraft. A box-like cover 13 encloses the intervalometer mechanism and carries in its top a glass window 14 (Figure 4) through which the intervalometer dial 15, together with pointers 16 and 17 may be readily observed. Also carried by the top of cover 13 (Figure 1) is a frosted glass button 18 or the like, which overlies a warning light 19 (Figure 3). Light 19 advises the pilot or photographer that an exposure is about to be made, in a manner described hereinafter. The top of cover 13 (Figure 1) includes an aperture 20 overlying the top of a conventional counter 21 (Figure 2) so that the indication on the counter may be easily read.

Cover 13 is cut away as at 22 (Figure 4), the edges of this opening fitting into a groove 23 cut in the top and opposite sides of a front plate 24 fastened to and extending upwardly from base 10. Front plate 24 carries electrical input and output terminals 25 and 26, respectively, a socket 27 adapted to receive a fuse, and an on and off switch 28 which may be manipulated as desired to condition the intervalometer for automatic operation or otherwise.

Secured to and extending vertically upwardly from the base 10 are a plurality of supporting posts 29 (Figures 2, 3 and 4), the tops of which are flush and have secured thereto a supporting partition 30, as by screws 31. This partition divides the space within cover 13 (Figure 4) into lower and upper compartments, the lower compartment housing the motor and driving mechanism of the intervalometer, the upper containing the driven mechanism by which the impulses are effected or created at regularly timed selectively predetermined intervals.

Figure 3:
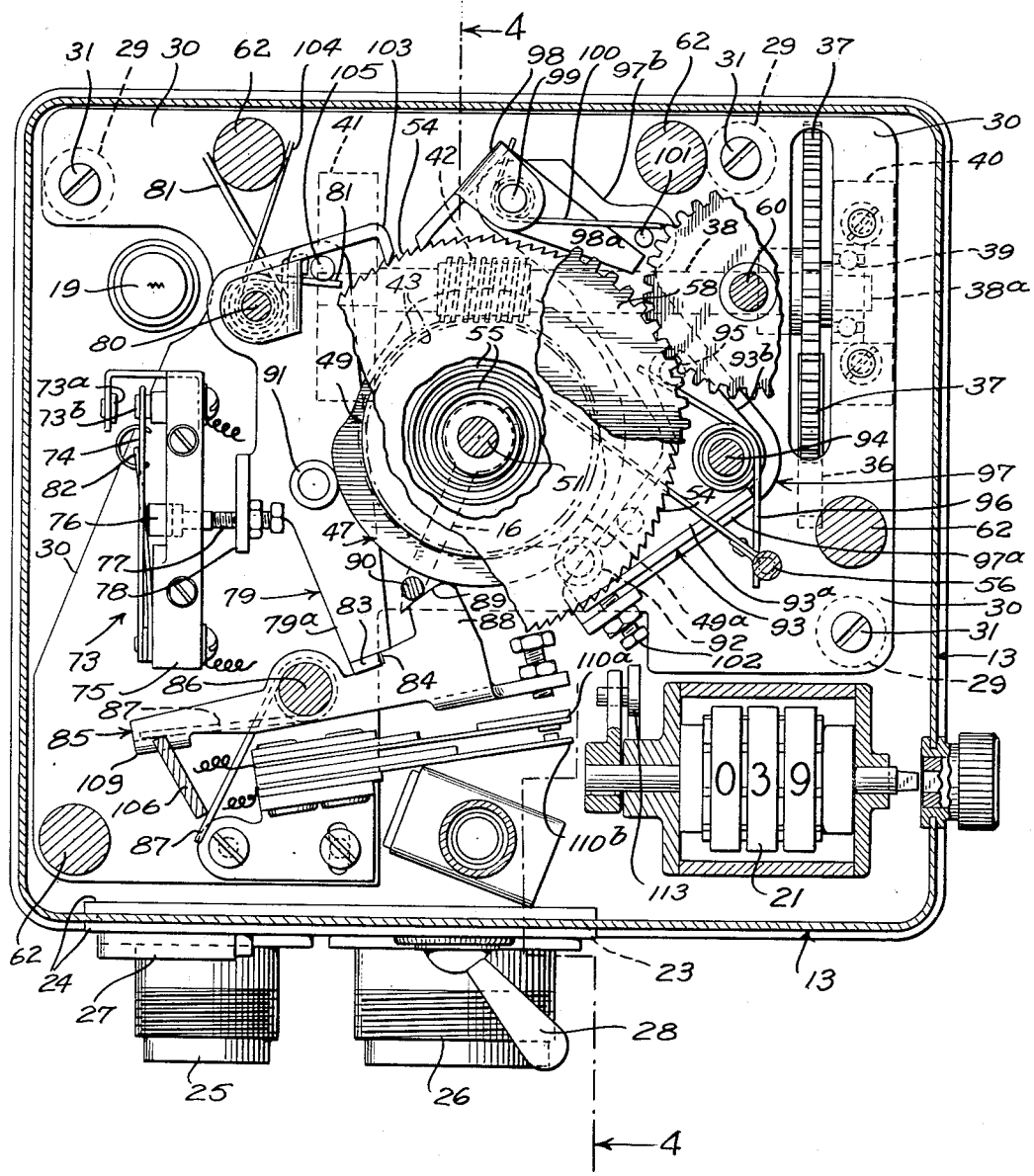
Figure 3 is an enlarged section taken along the line 3—3 of Figure 2, and also along the line 3—3 of Figure 4, portions of various parts being broken away to show the inter-relationship therebetween.
Figure 4:
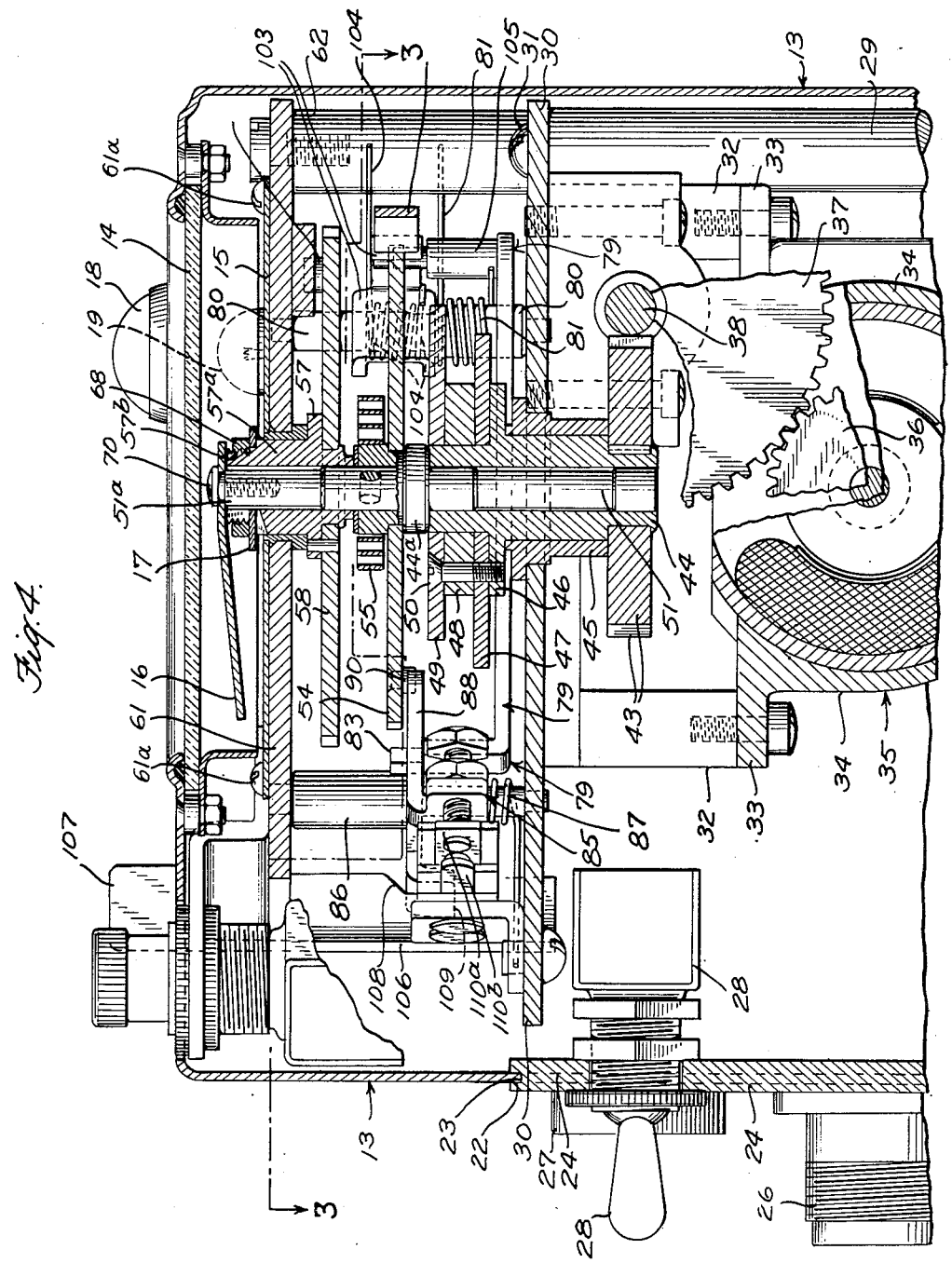
Figure 4 is a vertical fragmentary staggered section taken along the line 4—4 of Figure 3.

With reference to Figure 4, partition 30 has secured thereto and depending therefrom a plurality of posts 32 to which are fastened flanges 33 extending from the casing 34 of a driving motor 35. Motor 35 is preferably a small high speed electric motor capable of operating at a rate of on the order of 7200 R. P. M. Secured to the rotor of motor 35 is a gear 36 which meshes with a much larger gear 37 mounted on a shaft 38, one end 38a of which (Figure 3) is carried in a ball bearing 39 supported in a bracket 40 fastened to the underside of partition 30, the other end of shaft 38 being similarly mounted in a bracket or bearing block 41 also secured to the underside of partition 30. Shaft 38 carries a worm 42 which meshes with a worm wheel 43 (Figure 4) keyed to a sleeve 44 rotatably supported in a bushing 45 extending through and carried by partition 30. Midway of its ends, sleeve 44 is provided with an annular flange 46 on which are supported, one on top of another, a cam 47, a spacer 48 and another cam 49, all of which are securely pinned together and to sleeve flange 46 by a screw 50, so that the cams rotate with the sleeve and hence are driven by motor 35 through the medium of the gear train described.

Figures 5, 6:
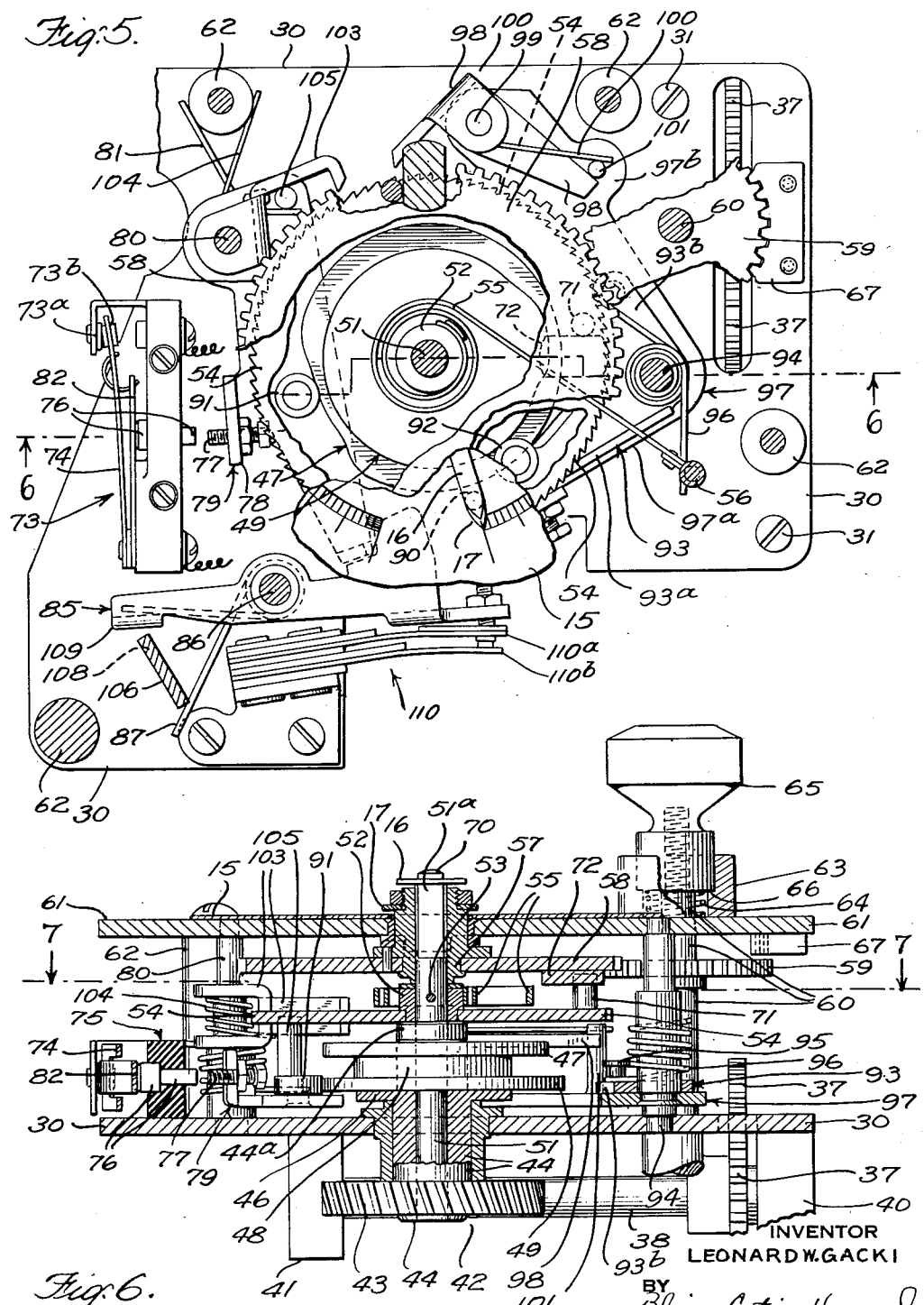
Figure 5 is a fragmentary view, somewhat similar to Figure 3, but showing the parts in different operative relationship.
Figure 6 is a vertical staggered section, taken along the line 6—6 of Figure 5; and, Figure 7 is a horizontal fragmentary section taken along the line 7—7 of Figure 6.

As is more clearly shown in Figure 6, a coaxial shaft 51 extends through sleeve 44 and is freely rotatable therewithin, being held in its proper operative position within the sleeve by a hub 52 pinned to the shaft by a pin 53. To this hub is secured a ratchet wheel 54 which accordingly is freely rotatable relative to sleeve 44 and the two cams attached thereto. It should here be noted that sleeve 44 is provided with an upper reduced portion 44a which effectively spaces ratchet 54 from upper cam 49. Hub 52 (Figure 5) also constitutes an anchor for one end of a coiled spring 55, the other end of which is fastened to a post 56 which may have its lower end fastened in partition 30, this spring being provided for a purpose which will be described below.

Figure 2:
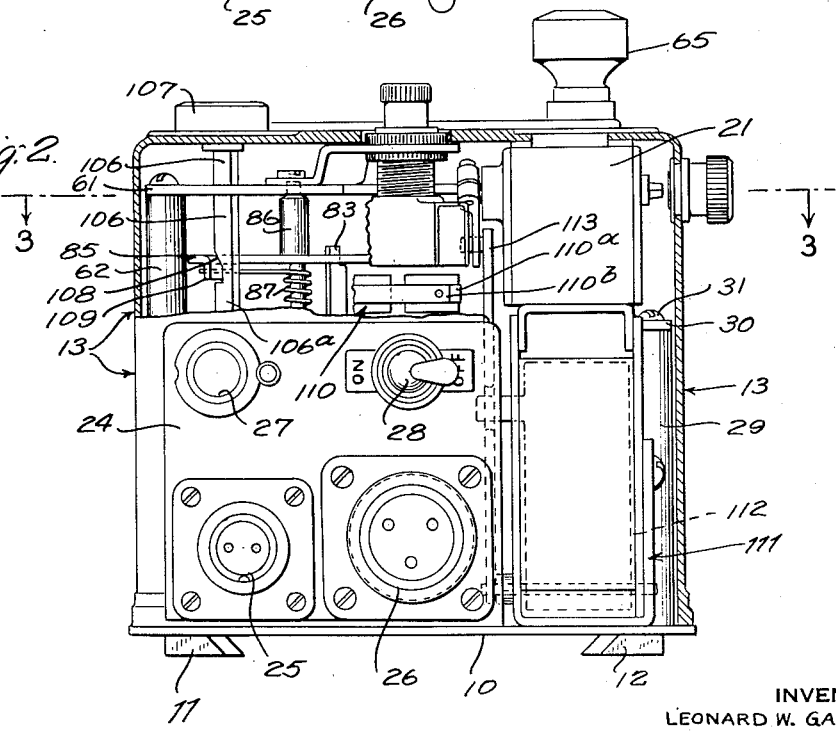
Figure 2 is an elevation of the front of my intervalometer, a portion of the casing being broken away to show certain features of interior construction.

Mounted on the upper end of shaft 51 (Figure 6) for free rotation relative thereto is another hub 57 to which is secured a setting gear 58 whose teeth mesh with those of another gear 59 secured between the ends of a stud 60, the lower end of which is reciprocably disposed in partition 30, and the upper end of which is similarly carried by an upper partition 61, these partitions being held in spaced relation by suitable posts 62 (see also Figures 2, 3 and 4). Referring back to Figure 6, the upper end of stud 60 is carried in a boss 63 mounted on top of partition 61, and has coiled about its upper end a spring 64 which is held compressed between a knob 65 screwed to the top of stud 60 and a shoulder 66 formed in boss 63, the bias of this spring tending to force shaft 60 upwardly. In Figure 6, the shaft, as well as gear 59, are shown in the lower position wherein gears 59 and 58 mesh to provide for the adjustment of setting gear 58 upon manipulation of knob 65. When knob 65 is released, spring 64 forces the knob and accordingly stud 60 and gear 59 upwardly so that gears 59 and 58 start to unmesh. Before they are completely unmeshed, gear 59 starts to mesh with a toothed stop 67 (see also Figure 5) which prevents rotation of the gear inadvertently or otherwise without depressing knob 65. When gear 59 is in full mesh with stop 67, it is out of mesh with gear 58.

As shown in Figure 4, hub 57 includes a reduced portion 57a which extends upwardly through partition 61 and also through a centrally located hole formed in the calibrated dial 15 which is fastened on top of partition 61 by screws 61a. The top of hub 57 is threaded as at 57b to receive a nut 68 which clamps the hub 69 of pointer 17 against a shoulder conveniently formed on hub 57a. The upper end 51a of shaft 51 extends through hub 57 to a point slightly above the end thereof so as to hold spaced therefrom the hub of pointer 16 which is fastened to the shaft end by a screw 70.

It will now appear that pointers 16 and 17 are movable relative to one another, the first pointer by reason of its being attached to shaft 51 and moving when ratchet wheel 54 is driven, pointer 17 moving with selector gear 58 when it is adjusted through manipulation of the interval setting knob 65 (Figures 1 and 6).

Spring 55 (Figures 5 and 6) is so coiled about hub 52 as to impart to the hub, and accordingly to ratchet wheel 54, a constant clockwise bias. Assuming that the ratchet were at all times freely rotatable relative to setting gear 58, it would rotate clockwise, as viewed in Figure 5, relative thereto, until a post 71 on the ratchet abutted a lug 72 on the underside of the gear. When the post and lug are engaged, pointers 16 and 17 (Figure 1) are in alignment. Hence it follows that upon manipulation of knob 65 in such a manner as to rotate setting gear 58 counterclockwise, as viewed in Figure 5, i. e. in a direction to reduce the interval, lug 72 carries post 71 and accordingly ratchet 54 with it. If, on the other hand, knob 65 (Figure 6) is so manipulated as to rotate setting gear 58 clockwise, as viewed in Figure 5, engagement between ratchet post 71 and gear lug 72 is still maintained because of the bias of spring 55 tending to rotate the ratchet and accordingly post 71 clockwise. In this direciton of operation, of course, the interval is increased. Hence it may be seen that at the beginning of an operational interval, the two pointers 16 and 17 always register regardless of the selected setting, and, as will be described, the remainder of the interval at any time can be readily ascertained by looking at the position of pointer 16 relative to the zero mark on graduated dial 15 (Figure 1).

As indicated hereinabove, my intervalometer is adapted periodically to effect an electrical impulse, i. e. to close a circuit which may effect operation of a remotely disposed camera generally in the manner shown in U. S. Letters Patent No. 2,048,439 to Sherman M. Fairchild. To this end, I have provided a snap switch generally indicated at 73 which is shown open in Figure 3 and closed in Figure 7. The movable contact 74 (Figure 3) of this spring is carried by a suitable block 75 fastened to the top of partition 30 and through this block extends a button 76, the right-hand end of which is engageable with a pin 77 adjustably mounted in an upstruck lip 78 of a control arm generally indicated at 79, pivotally mounted on a stud 80, and under a counterclockwise bias of a spring 81. Hence when control arm 79 is pivoted counterclockwise by spring 81 in the manner that will be described, its pin 77 moves to the right away from switch button 76 which permits the movable contact arm 74 of the switch to snap over to the left, i. e. to the position shown in Figure 5 by the operation of a spring 82. When, however, control arm 79 is pivoted clockwise from the position shown in Figure 5, in a manner to be described, pin 77 reengages button 76, forcing the button to the position shown in Figure 3, wherein it causes switch arm 74 to move to the right to separate the switch contacts 73a and 73b. As will be described, counterclockwise pivoting of control arm 79 to close switch 73 occurs at the end of the interval.

Still referring to Figure 3, the free end 79a of control arm 79 has an upstruck lip 83 formed thereon which is adapted to engage behind a shoulder 84 formed on a lever 85 pivotally mounted on a pin 86, and under a counterclockwise bias of a spring 87. Lever 85 includes at one end thereof a lobe 88 provided with a cam surface 89 against which a pin 90 carried on the underside of ratchet 54 rides a few seconds before the end of the interval. Accordingly, as ratchet 54 is driven (as will be described) to the end of the interval, its pin 90 riding against the cam surface 89 of lever lobe 88 rocks the lever clockwise, as viewed in Figure 3, against the bias of spring 87, the cam surface being so contoured in relation to the depth of shoulder 84 that preferably at a fraction of a second before the end of the interval, lever 85 is rocked sufficiently so that its shoulder 84 clears lip 83 of control arm 79, thus to condition arm 79 for counterclockwise movement about its pivot 80 by the driving force of its spring 81.

Control arm 79, however, preferably carries a roller 91 which rides on the periphery of lower cam 47, which is so contoured that it holds the control arm in the Figure 3 position for a fraction of a second after lip 83 and shoulder 84 have cleared one another. When, however, cam 47 has been rotated into its Figure 7 position, roller 91, under the bias of spring 81, is forced into a depression 47a of the cam, thus permitting control arm 79 to rock counterclockwise to disengage pin 77 from button 76 and hence permit switch 73 to close, as described above.

Closing of switch 73 establishes the circuit to the camera motor, as will be described, thus sending an operating impulse, the duration of which is determined by the arcuate length of the dwell or depression 47a on cam 47. As cam 47 continues to rotate, its dwell 47a passes roller 91, the roller thereafter riding on that portion of the cam which has the greater radius, thus to force control arm 79 clockwise, which causes switch 73 to open. At the same time, ratchet wheel 54 and the pin 90 carried thereby are released in a manner to be described, so as to rotate clockwise under the driving force of spring 55 back to their starting point to recommence an interval of operation.

Figure 7:
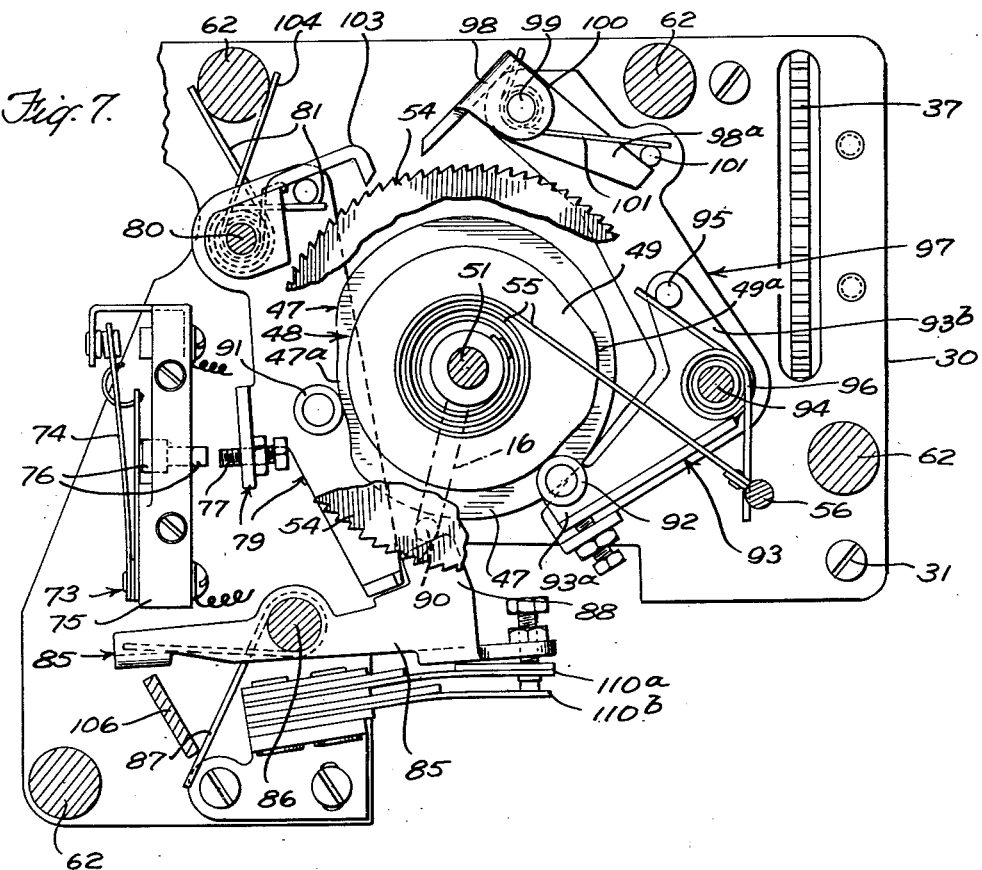

The manner in which ratchet 54 is incrementally advanced so as to move the pin 90 carried thereby into the Figure 7 position will now be described. Upper cam 49 (Figures 3 and 7) has a lobe 49a formed thereon, and on the periphery of this cam rides a roller 92 which is carried on one arm 93a of a bell crank lever, generally indicated at 93, pivotally mounted on a pin 94, the other arm 93b of this lever carrying a pin 95. A spring 96 is coiled about pin 94 so that one end of the spring bears against post 56, while the other end bears against lever pin 95 to force lever 93 clockwise, as viewed in Figure 7, thus to hold roller 92 in engagement with the periphery of cam 49.

Also pivotally carried by pin 94 is another bell crank lever, generally indicated at 97, one arm 97a thereof underlying arm 93a of lever 93, the other arm 97b thereof carrying a pawl or picker 98 which is pivoted on a pin 99 fastened to the end of lever arm 97b. A spring 100 is coiled about pin 99, one end of this spring bearing against a post 101 on arm 97b while the other end of the spring bears against pawl 98, thus to bias the pawl counter-clockwise about pin 99. Counterclockwise movement of the pawl, however, is limited by the engagement of a tail 98a formed on the pawl with pin 101. Arm 97a of lever 97 carries a set screw and lock nut generally indicated at 102, the end of the set screw bearing against the end of arm 93a of lever 93 so that the angular relation between levers 93 and 97 may be adjusted as desired, accordingly to set pawl 98 correctly in relation to ratchet 54. It will now appear that as lobe 49a of cam 49 rides past roller 92, lever 93, and accordingly lever 97, are rocked counterclockwise, with the result that pawl 98 engages one of the teeth of ratchet 54 to advance the ratchet through a degree of rotation equal to the desired increment of advance, illustratively one tooth, the ratchet accordingly being rotated counterclockwise against the clockwise bias of spring 55. In order to prevent clockwise rotation of the ratchet after it is released by pawl 98, I have provided a detent 103 which is pivoted on stud 80, and is given a clockwise bias by a spring 104 which forces the detent into ratcheting engagement with ratchet 54 when control arm 79 is in the position shown in Figure 3. Thus it follows that pawl 98 drives ratchet 54 counterclockwise, illustratively one tooth per revolution of cam 49, which also illustratively may rotate at a speed of on the order of one revolution per second, and pawl 103 holds the ratchet against clockwise rotation. Hence the ratchet pin 90 is incrementally advanced from its starting position to its switch operating position (shown in Figure 7) wherein it rocks lever 85 clockwise to release control arm 79 which may rock counterclockwise as roller 91 rides into cam depression 47a, permitting switch 73 to close. As ratchet 54 and pointer 16 are both secured to shaft 51 (Figure 4) it follows that pointer 16 follows the movement of the ratchet, thereby making it possible for the operator to determine at any moment how much of the predetermined selected interval remains before an impulse will be created to operate the camera.

As noted above, control arm 79 (Figure 7) rocks counterclockwise when ratchet pin 90 rocks lever 85 clockwise. This movement of the control arm is transmitted by a pin 105 to detent 103 which is held in engagement with this pin by spring 81, so that the detent is swung counterclockwise out of engagement with the teeth of ratchet 54. The ratchet thus disengaged is accordingly free to rotate clockwise under the bias of spring 55 to its predetermined starting point, i. e. that point at which its pin 71 (Figure 6) engages the abutment 72 carried on the under surface of setting gear 58. This return of the ratchet to its starting position is effected while roller 91 (Figure 7) is riding on the dwell of depression 47a so that when the roller rides out of the dwell as cam 47 continues to rotate, the ratchet is returned to its starting position where it is reengaged by detent 103 upon the clockwise movement of control arm 79 as roller 91 rides on that surface of cam 47 having the greater radius. Cam depression 47a of cam 47, and lobe 49a on cam 49 are angularly displaced by such an amount that picker 98 is out of engagement with ratchet 54 while roller 91 is riding on the dwell of depression 47a, thus to permit the free return of the ratchet. By this arrangement of the depression and lobe of the two cams, there is no hiatus between the end of one interval and the beginning of the successive interval, thus assuring accurately uniform, successive intervals. It may also be seen that at any time during the interval, the period of the next succeeding interval may be reset through the operation of knob 55 in the manner heretofore described, as setting gear 58 is always free to rotate in either direction relative to ratchet 54. If it is desired to increase the interval, the setting gear is rotated clockwise, as viewed in Figure 5, which moves its abutment 72 away from ratchet pin 71, whereas, if it is desired to shorten the next succeeding interval, the setting gear abutment 72 picks up the ratchet pin 71 during counterclockwise rotation, thus driving the ratchet past detent 103 by the desired amount.

It frequently occurs during a photographic mission that the operator for one reason or another desires to commence a new cycle of operation before the immediate interval is terminated. This recycling is effected by means of a plunger 106 (Figure 2), the upper end of which extends through the top of cover 13 and has fastened thereto a finger piece 107, the lower end 106a (Figure 4) of the plunger riding in a slot formed in partition 30. Between the upper and lower ends of plunger 106 (Figure 2) is formed a cam 108 which when the plunger is in its normal or inoperative position (its Figure 2 position) lies just above a lip 109 formed on the left-hand end of lever 85, as shown in Figure 3. A suitable spring (not shown) holds plunger 106 in its upper or inoperative position so that when it is desired to recycle the intervalometer, finger piece 107 is depressed against the bias of this spring, forcing plunger 106 downwardly so that its cam 108 riding against lip 109 causes lever 85 (Figure 3) to rock clockwise, which movement of the lever, as heretofore described, releases control arm 79, conditioning the arm to permit switch 73 to close when the arm roller 91 rides into cam depression 49a. If thereafter finger piece 107 (Figure 2) is released to allow plunger 106 to rise to its inoperative position, the operation of the intervalometer follows, as described before. Thus, the immediate interval is shortened, as desired, and a picture is taken without, however, affecting the duration of the succeeding interval.

As it is desirable that the operator be apprised of the impendency of each impulse, i. e. the taking of each picture, signal light 19 is connected in the circuit of a switch generally indicated at 110 (Figure 3) so that when the switch contacts 110a and 110b are closed by lever 85 every time the lever is rocked counterclockwise the light is turned on. Contacts 110a and 110b are closed a few seconds before switch 73 is closed.

It is also desirable that an accurate count be kept of the number of pictures taken. To this end, I have provided a solenoid generally indicated at 111 and in circuit with switch 73. Thus switch 73, upon being closed, energizes the circuit of solenoid 111 (Figure 2) which, upon energization, rocks an armature 112 in such a manner as to operate a suitable linkage generally indicated at 113, which is connected to counter 21, the linkage upon actuation advancing the counter one digit.

It will now appear that as the end of the interval approaches, a warning signal is first given to indicate the impendency of the impulse. Within a short time the impulse itself is created, and at the same time the counter is operated to record the serial number of the impulse.

Accordingly, the several objects set forth hereinabove have been obtained in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a device for serially effecting impulses at selective predetermined intervals, the combination of, a motor, a member constantly rotated by said motor, a rotatable element, means cyclically operated by said member for rotating said element a predetermined amount for every revolution of said member, selector means for setting said element relative to said member in any of a plurality of positions to predetermine the period of total movement of said element, a second member constantly rotated by said motor, a switch, and releasable means for opening and closing said switch, said releasable means including an arm normally held in switch opening position, said arm including a follower which engages the periphery of said second member which holds said follower and accordingly said arm in switch opening position during a major portion of the rotation of said second member, said second member including a portion which when juxtaposed to said arm member allows switch closing movement of said arm, said last-mentioned means also including a lever which engages said arm to hold said arm in switch opening position, said lever having a portion engageable by said rotatable element at the end of its predetermined period of movement for swinging said lever out of engagement with said arm to release said arm for switch closing operation when said arm is juxtaposed to said portion of said second member.

2. In a device for serially effecting impulses at selected predetermined intervals, the combination comprising a motor, a first and a second cam each connected to said motor so as to be rotated continually thereby, said second cam having a first and a second portion, a ratchet, means cyclically actuated by said first cam for rotating said ratchet a predetermined amount for each actuation, a switch closable to effect an electrical impulse, means associated with said switch and movable between switch closing and switch opening positions and engageable alternately with said first and second portions of said second cam, said first portion holding said last-mentioned means in switch opening position when engaged therewith, said second cam portion effecting movement of said last-mentioned means to said switch closing position when engaged therewith, a lock normally retaining said last-mentioned means in switch opening position, and means operated by said ratchet at the end of its predetermined period of movement for releasing said lock and putting said last-mentioned means into condition for switch closing operation.

3. Apparatus according to claim 2 wherein there are provided means for setting said ratchet in any of a plurality of positions for predetermining its period of total movement.

4. Apparatus according to claim 2 wherein the movable means associated with the switch comprises an arm having a cam follower mounted thereon, and spring means biasing said arm toward the second of said cams for holding said follower against its periphery.

5. Apparatus according to claim 2 wherein the movable means associated with the switch comprises an arm having a cam follower mounted thereon, spring means biasing said arm toward the second of said cams for holding said follower against its periphery, and latch means for normally holding said arm against switch opening movement.

6. Apparatus according to claim 2 wherein the movable means associated with the switch comprises an arm having a cam follower mounted thereon, spring means biasing said arm toward the second of said cams for holding said follower against its periphery, latch means for normally holding said arm against switch opening movement, and means associated with said latch for engaging said latch at the end of the ratchet's predetermined period of movement for moving said latch to release said arm.

7. Apparatus according to claim 2 wherein there is provided means operated by said ratchet operated means for indicating the impendency of switch closing operation.

8. Apparatus according to claim 2 wherein said cyclically operated means includes a pawl, spring means associated with said ratchet for constantly biasing it counter to its direction of rotation as effected by said pawl, a detent for holding said ratchet against such counter-rotation while the pawl and ratchet are disengaged, and means operative at the end of the predetermined period of movement of said ratchet for disengaging said detent from said ratchet whereby said ratchet may be rotated by said spring counter to the direction it is rotated by said pawl.

9. In a device for serially effecting impulses at selective predetermined intervals, the combination comprising a housing, a motor mounted in said housing, a shaft in said housing, gear means connecting said motor and said shaft, a first cam having an actuating portion and driven by said shaft, a second cam having an actuating portion and driven by said shaft, a rotatable ratchet, said ratchet and said first and second cams being positioned for rotation about a common axis, means including a pawl operated by said actuating portion of said first cam for incrementally rotating said ratchet, an arm movable between a first and a second position, said arm being engageable with said second cam and adapted to be actuated by said actuating portion thereof to effect movement of said arm to its second position, holding means normally maintaining said arm in its first position, and means under the control of said ratchet for releasing said holding means at the end of the total movement of said ratchet, thereby to permit said actuating portion of said second cam to effect movement of said arm to said second position.

10. In a device for serially effecting impulses at selective predetermined intervals, the combination comprising a motor, a first cam having an actuating portion, a second cam having an actuating portion, said cams being connected to said motor and driven synchronously thereby, said actuating portions being mutually displaced so as to be effective at different times during the rotative cycle, a rotatable ratchet, means including a pawl operated by said actuating portion of said first cam for incrementally rotating said ratchet, a switch having a first and second electrical position, a switch actuating mechanism movable between a first position wherein said switch is actuated to its first position and a second position wherein said switch is actuated to its second position, a spring biasing said switch actuating mechanism toward its second position, said actuating mechanism being engageable with said second cam and adapted to be actuated by said actuating portion of said second cam to effect movement of said actuating mechanism to its second position, holding means normally maintaining said switch actuating mechanism in its first position, and means under the control of said ratchet for releasing said holding means at the end of the total movement of said ratchet, thereby to permit said actuating portion of said second cam to effect movement of said actuating mechanism to said second position.

LEONARD W. GACKI.

REFERENCES CITED

The following references are of record in the file of this patent:

UNITED STATES PATENTS

| Number | Name | Date |
| --- | --- | --- |
| 1,726,520 | Kramer | Aug. 27, 1929 |
| 1,764,066 | Chamberlin | June 17, 1930 |
| 2,025,511 | Johnson | Dec. 24, 1935 |
| 2,048,439 | Fairchild | July 21, 1936 |
| 2,219,636 | Schwartz | Oct. 29, 1940 |
| 2,402,965 | Hornberger | July 2, 1946 |